United States Patent
Le Rouzic et al.

(10) Patent No.: US 11,770,743 B2
(45) Date of Patent: Sep. 26, 2023

(54) METHODS FOR EXCHANGING MESSAGES AND MANAGING MESSAGES, TERMINAL AND MESSAGING SERVER

(71) Applicant: Orange, Paris (FR)

(72) Inventors: Jean-Claude Le Rouzic, Chatillon (FR); Marc Bailly, Chatillon (FR); Yann Gestraud, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 16/336,066

(22) PCT Filed: Sep. 21, 2017

(86) PCT No.: PCT/FR2017/052534
§ 371 (c)(1),
(2) Date: Mar. 22, 2019

(87) PCT Pub. No.: WO2018/055293
PCT Pub. Date: Mar. 29, 2018

(65) Prior Publication Data
US 2019/0261228 A1 Aug. 22, 2019

(30) Foreign Application Priority Data
Sep. 23, 2016 (FR) .................................. 1658948

(51) Int. Cl.
*H04W 36/00* (2009.01)
*H04W 36/30* (2009.01)
(Continued)

(52) U.S. Cl.
CPC ....... *H04W 36/0022* (2013.01); *H04L 51/043* (2013.01); *H04L 51/10* (2013.01);
(Continued)

(58) Field of Classification Search
CPC . H04W 36/0022; H04W 4/12; H04W 36/305; H04W 4/14; H04W 36/36;
(Continued)

(56) References Cited

U.S. PATENT DOCUMENTS

2010/0217809 A1* 8/2010 Vymenets ............ G06Q 10/10
709/206
2013/0227030 A1* 8/2013 Eidelson ................ H04L 51/23
709/206
(Continued)

OTHER PUBLICATIONS

GSM Association Non-confidential Official Document RCC.61—RCS Common Core Service Description Document, Sep. 16, 2014, Retrieved from the Internet: URL: http://www.gsma.com/network2020/wp-content/uploads/2014/07/RCS-Common-Core-SDD-V1.0.pdf (Year: 2014).*
(Continued)

*Primary Examiner* — Thinh D Tran
(74) *Attorney, Agent, or Firm* — Knobbe, Martens, Olson & Bear, LLP (57) ABSTRACT

Communication by messages such as provided by the mobile telephony standard, Rich Communication Services (RCS), is described. A method for exchanging messages implemented by a user terminal capable of transmitting a message via one of a first network and a second network is described, the method including, when the terminal of the user is in a second transmission mode for a contact terminal, triggering a failover of the user terminal in a first transmission mode for the contact terminal, as soon as a notification is received at the terminal of the user of connecting to the first network of the contact terminal coming from a messaging server on the first network. Thus, returning to using the first network by the user terminal only depends on one single message: the connection notification, and the exchanges for determining the capacities of the terminal of
(Continued)

the contact are reduced, since this notification is only sent when the connection of the contact terminal to the first network is effective.

18 Claims, 5 Drawing Sheets

(51) Int. Cl.
| | |
|---|---|
| *H04L 51/043* | (2022.01) |
| *H04L 51/10* | (2022.01) |
| *H04W 4/14* | (2009.01) |
| *H04W 36/36* | (2009.01) |
| *H04W 68/00* | (2009.01) |
| *H04W 80/10* | (2009.01) |
| *H04W 88/18* | (2009.01) |
| *H04W 4/12* | (2009.01) |
| *H04L 51/58* | (2022.01) |
| *H04L 67/54* | (2022.01) |

(52) U.S. Cl.
CPC .............. *H04L 51/58* (2022.05); *H04L 67/54* (2022.05); *H04W 4/12* (2013.01); *H04W 4/14* (2013.01); *H04W 36/305* (2018.08); *H04W 36/36* (2013.01); *H04W 68/005* (2013.01); *H04W 80/10* (2013.01); *H04W 88/184* (2013.01)

(58) Field of Classification Search
CPC . H04W 68/005; H04W 80/10; H04W 88/184; H04L 67/24; H04L 51/043; H04L 51/10; H04L 51/38
See application file for complete search history.

(56) References Cited

U.S. PATENT DOCUMENTS

2016/0275301 A1* 9/2016 Marya ................. G06F 21/6245
2018/0054406 A1* 2/2018 Albouyeh ............. H04L 67/306

OTHER PUBLICATIONS

GSM Association Non-confidential Official Document RRC.07—Rich Communication Suite 6.0 Advanced Communications Services and Client Specification Version 7.0, Mar. 21, 2016 (Year: 2016).*
GSM Association Non-confidential Official Document RRC.07—Rich Communication Suite 5.1 Advanced Communications Services and Client Specification Version 2.0, May 3, 2013 (Year: 2013).*
GSM Association Non-confidential Official Document IR.90—RCS Interworking Guidelines Version 13.0, May 6, 2016 (Year: 2016).*
International Search Report and Written Opinion dated Dec. 7, 2017 for Application No. PCT/FR2017/052534.
GSM Association Non-confidential Official Document RCC.61—RCS Common Core Service Description Document, Sep. 16, 2014, Retrieved from the Internet: URL: http://www.gsma.com/network2020/wp-content/uploads/2014/07/RCS-Common-Core-SDD-V1.0.pdf.

* cited by examiner

METHODS FOR EXCHANGING MESSAGES AND MANAGING MESSAGES, TERMINAL AND MESSAGING SERVER

RELATED APPLICATIONS

This application is the U.S. National Phase of Application No. PCT/FR2017/052534 entitled "METHODS FOR EXCHANGING MESSAGES AND MANAGING MESSAGES, TERMINAL AND MESSAGING SERVER" and filed Sep. 21, 2017, which claims the benefit of French Patent Application No. 1658948, filed Sep. 23, 2016, each of which is incorporated by reference in its entirety.

The invention relates to communication by messages. In particular, the invention relates to communication by messages such as is provided for by the RCS (Rich Communication Services) mobile telephone standard.

One of the services proposed by the RCS mobile telephone standard is enriched messaging or "rich messaging". This messaging service allows users to exchange text or multimedia messages. By default, the RCS standard, like other instant messaging services, is based on the IP protocol requiring a connection on a data network or data connectivity.

The main drawback of this type of messaging for users of mobile telephones, smartphones . . . is that the connection to the data network is often fluctuating because of the roaming character of the terminals used to access the over-IP messaging service. For example, when a terminal of a user A sends an IP message to a terminal of a user B, if the telephone of the recipient B of the IP message is not connected to the data network, the terminal of the recipient B will not receive the IP message which is intended for it. This is why the RCS standard provides for a storage and transfer functionality, termed "Store & Forward" in English, which allows the messaging server of the data network to preserve the IP message until the telephone of the recipient B retrieves data coverage, that is to say that it reconnects to the data network. The messaging server will then push the preserved IP message to the telephone of the recipient B.

The "Store & Forward" function therefore makes it possible to alleviate fluctuating network coverages but not the absence of access to the data network for a lengthy period (deactivation of the use of the data network, in particular when "roaming", that is to say when the terminal of the recipient B uses the network of a partner operator of the operator with which it has subscribed, for example abroad). Indeed, even if the terminal of the recipient B recovers the IP message which was intended for it after this lengthy period, the proposed messaging loses its interest since it loses its so-called "instant" character. Accordingly, the RCS standard has provided for a fallback mode: the exchanging of the messages by SMS therefore using a fallback network, in this instance the mobile telephone network or cellular network. Thus, when the IP message sent by the terminal of the user A is not transmitted to the terminal of the user B since the latter is not connected to the data network, the terminal of the user of A re-sends the message in SMS form to the terminal of the user B. The terminal of the user A has then toggled into SMS mode of transmission for the terminal of the user B. To prevent the terminal of the user A from continuing to send the messages in SMS form even when the terminal of the user B has reconnected to the data network, the RCS standard has provided for verification of the connection of the terminal of the user B by polling. Thus, the terminal of the user A in SMS mode of transmission for a terminal of a user B, verifies the IP connectivity of the terminal of the user B. Accordingly, the two terminals perform an exchange of the capabilities between IP terminals by messages predefined by the RCS standard, termed "SIP OPTIONS", and an analysis of the replies. The drawback of the polling procedure is that it consumes resources.

The current policy of combining IP instant messaging or chat services and SMS (so-called "messaging") services according to the RCS standard is based on the following principles:

Use of the chat as default messaging service to a terminal of the contact B having previously been discovered as supporting RCS services;

Fallback to SMS for communications by messages with the terminal of the contact B provided that a Chat message or IP message has not been able to be delivered to the terminal of the user B by using the IP network with revocation of the message of the "Store & Forward" base to avoid any message doubleton;

When fallback is activated, use of the SIP OPTIONS messages or of any other event manifesting a return under IP connectivity of the terminal of the user B (for example, reception of a Chat message originating from the terminal of the user B, etc.) to determine when the return to the nominal Chat service can be performed. This policy makes it possible to optimize the use of the SIP OPTIONS messages but the latter nonetheless remain indispensable.

One of the aims of the present invention is to afford improvements with respect to the prior art.

A subject of the invention is a method for exchanging messages implemented by a terminal of a user able to transmit a message via a network from among: a first network and a second network, the method for exchanging messages comprises, when the terminal of the user is in a second mode of transmission for a terminal of a contact, a triggering of a toggling of the terminal of the user into a first mode of transmission for the terminal of the contact upon receipt of a notification, to the terminal of the user, of connection to the first network of the terminal of the contact originating from a messaging server on the first network. Thus, the return to the use of the first network by the terminal of the user depends only on a single message: the notification of connection. The exchanges for determining the capabilities of the terminal of the contact are thus reduced since this notification is sent solely when the connection of the terminal of the contact to the first network is effective. The invention therefore makes it possible to reduce the use of resources.

Advantageously, the toggling is performed subsequent to a detection, by the messaging server, of connection of the terminal of the contact to the first network. Thus, the return to the use of the first network by the terminal of the user does not depend on the periodic sending of queries about the capabilities of the terminal of the contact and on the analysis by the terminal of the user of a reply of the terminal of the contact, in particular during a polling procedure, but on a detection of connection by the messaging server. The invention therefore makes it possible to reduce the use of the resources of the terminals and of the first network.

Advantageously, the first network is a data network and the second network is a circuit network. Thus, the exchanges of messages are faster by virtue of the data network used as default network and the securer fallback network in terms of connectivity for the roaming terminals.

A subject of the invention is also a communication device for communicating messages of a terminal of a user, the communication device able to transmit a message via a network from among: a first network and a second network, the communication device comprising a controller able to trigger, on receipt of a notification to the terminal of the user of connection to the first network of a terminal of a contact originating from a messaging server on the first network, a toggling of the terminal of the user into a first mode of transmission for the terminal of the contact, when the terminal of the user is in a second mode of transmission for a terminal of a contact.

A subject of the invention is further a terminal of a user comprising a device for communicating messages able to transmit a message via a network from among: a first network and a second network, the terminal of the user comprising a controller able to trigger, on receipt of a notification to the terminal of the user of connection to the first network of a terminal of a contact originating from a messaging server on the first network, a toggling of the terminal of the user into a first mode of transmission for the terminal of the contact, when the terminal of the user is in a second mode of transmission for a terminal of a contact.

A subject of the invention is also a method for managing messages implemented by a messaging server on a first network, the method for managing messages comprises, when a terminal of a user is in a second mode of transmission for a terminal of a contact, a sending to the terminal of the user of a notification of connection to the first network of the terminal of the contact, the notification of connection triggering a toggling of the terminal of the user into a first mode of transmission for the terminal of the contact. Thus, the return to the use of the first network by the terminal of the user depends only on a single message: the notification of connection. Thus, the exchanges for determining the capabilities of the terminal of the contact are reduced since this notification being sent solely when the connection of the terminal of the contact to the first network is effective. The invention therefore makes it possible to reduce the use of resources.

Advantageously, the method for managing messages comprises, when a terminal of a user is in a second mode of transmission for a terminal of a contact, a detection of a connection to the first network of the terminal of the contact, subsequent to which the sending of the notification of connection is performed. Thus, the return to the use of the first network by the terminal of the user does not depend on the periodic sending of queries about the capabilities of the terminal of the contact and on the analysis by the terminal of the user of a reply of the terminal of the contact, in particular during a polling procedure, but on a detection of connection by the messaging server. The invention therefore makes it possible to reduce the use of the resources of the terminals and of the first network.

Advantageously, the detection of connection to the first network of the terminal of the contact comprises a detection of a message originating from the terminal of the contact via the first network. Thus, any message on the first network originating from the terminal of the contact detected by the messaging server, regardless of the type of message and the recipient of the message, will trigger the toggling into the first mode of transmission of the terminal of the user for message exchange with the terminal of the contact.

Advantageously, the detection of connection to the first network of the terminal of the contact comprises a detection of a reception by the messaging server of a control message for deleting a message stored on the messaging server, the control message originating from the terminal of the contact. Thus, an attempted message send on the first network of the terminal of the contact to a terminal of an interlocutor which is detected by the messaging server of the terminal of the user will trigger the toggling into the first mode of transmission of the terminal of the user for message exchange with the terminal of the contact.

Advantageously, the method for managing messages comprises, when a terminal of a user is in a second mode of transmission for a terminal of a contact, a generation of a notification of connection to the first network of a terminal of a contact of a terminal of a user, the generation of the notification of connection providing the notification of connection generated on the sending to the terminal of the user. Thus, the notification of connection sent will be able to be dependent on the terminal of the contact and/or on the terminal of the user.

Advantageously, the generation of notification of connection is triggered by an event relating to a connection to the first network of the terminal of the contact from among:
  The detection of connection to the first network of the terminal of the contact;
  A toggling into a second mode of transmission of the terminal of the user for the terminal of the contact.

In the first case, the triggering of the generation by the detection of connection, the sending will be able to be triggered indirectly by the detection of connection on receiving the notification of connection generated on command of this detection of connection. Thus, the notification generated will not have to be preserved before its sending. Furthermore, in the case of the first option if the terminal of the user is not connected to the first network during this detection and the second option: toggling into the second mode of transmission, the notification of connection will be able to be generated in a manner non-concomitant with its sending. This makes it possible to reduce the latency between the detection of the connection of the terminal of the contact to the first network and the toggling of the terminal of the user into the first mode of transmission for the terminal of the contact.

Advantageously, an implementation of the sending of the notification is dependent on a state of connection to the first network of the terminal of the user. Thus, if the terminal of the user is not connected to the first network at the moment when the connection to the first network of the terminal of the contact is detected, the notification is not sent immediately but only as soon as the terminal of the user will be reconnected to the first network avoiding information loss and therefore the preservation of the terminal of the user in the second mode of transmission for the contact terminal.

Advantageously, according to an implementation of the invention, the various steps of the methods according to the invention are implemented by software or a computer program, this software comprising software instructions intended to be executed by a data processor of a device forming part of a terminal of a user or of a messaging server and being designed to control the execution of the various steps of these methods. The invention therefore also envisages a program comprising program code instructions for the execution of the steps of the method for exchanging messages, and/or of the method for managing messages when said program is executed by a processor. This program can use any programming language and be in the form of source code, object code or code intermediate between source code and object code such as in a partially compiled form or in any other desirable form.

A subject of the invention is further a messaging server of a first network comprising a sender making it possible to send, when a terminal of a user is in a second mode of transmission for a terminal of a contact, to the terminal of the user a notification of connection to the first network of the terminal of the contact, the notification of connection triggering a toggling of the terminal of the user into a first mode of transmission for the terminal of the contact.

Advantageously, the messaging server comprises a detector of connection to the first network of a terminal of a contact able to trigger a sending by the sender of the notification of connection.

The characteristics and advantages of the invention will become more clearly apparent on reading the description, given by way of example, and the figures pertaining thereto which represent.

Figure 1A:
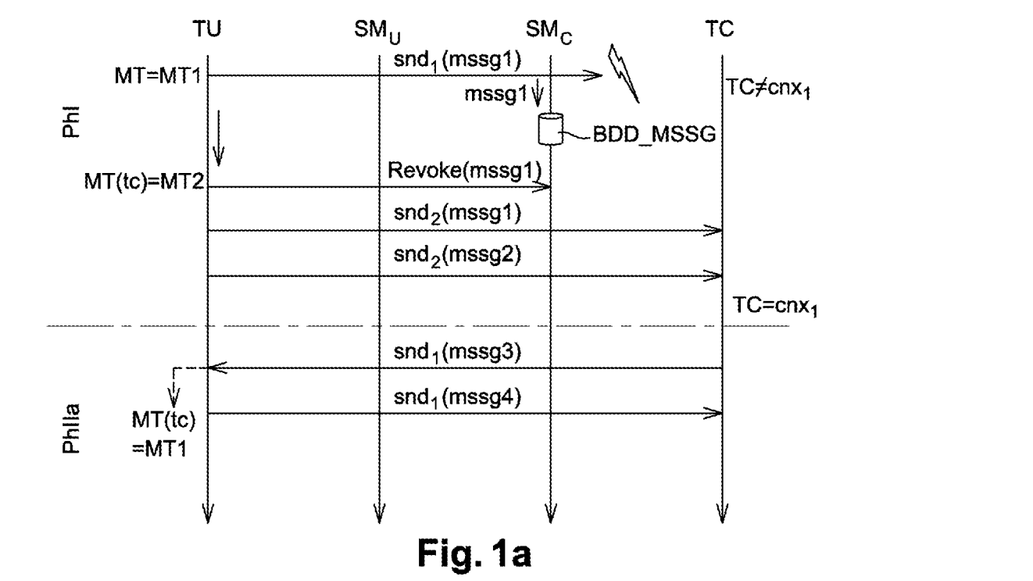
FIGS. 1a and 1b, charts of exchange of messages implementing the RCS standard in the case where the terminal of the user is, respectively connected and disconnected to the first network when the terminal of a contact reconnects to the first network, according to the prior art, FIG. 2, a simplified diagram of a method for exchanging messages implemented by a terminal of a user according to the invention, FIG. 3, a simplified diagram of a method for managing messages implemented by a messaging server according to the invention, FIG. 4, a message communication architecture implementing a terminal of a user and a messaging server according to the invention, FIG. 5, a message exchange chart in the case where the terminal of the user is disconnected from the first network when the terminal of a contact reconnects to the first network, according to the invention, FIG. 6, a message exchange chart in the case where the messaging server of the terminal of the user detected a message on the first network of the terminal of a contact, according to the invention.
Figure 1B:
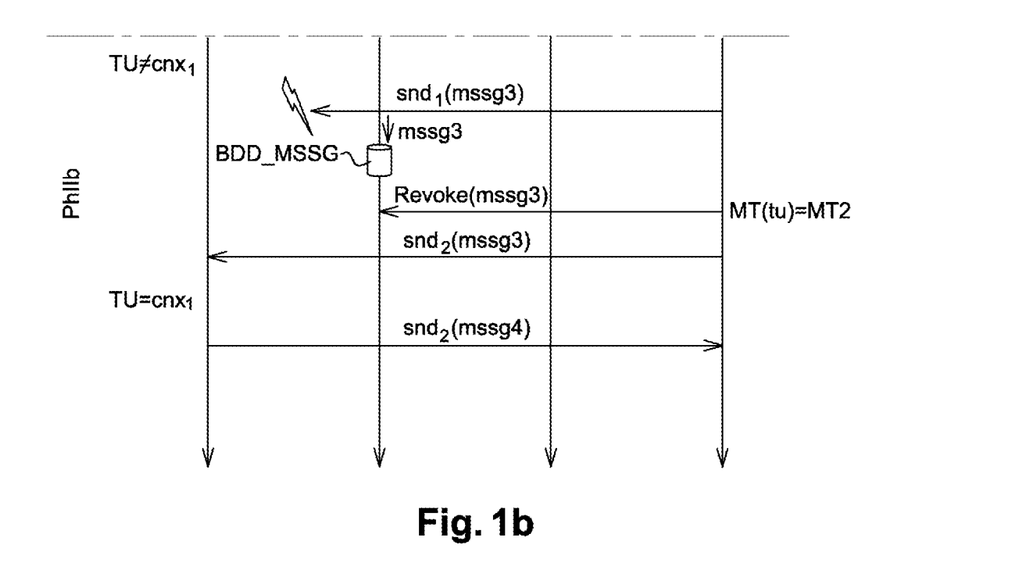

FIGS. 1a and 1b illustrate the prior art. In particular, in the case of the use of the RCS standard without the SIP OPTIONS. FIG. 1a illustrates a message exchange chart implementing the RCS standard in the case where the terminal of the user is connected to the first network when the terminal of a contact reconnects to the first network, according to the prior art.

In order to limit the use of the resources, in particular through the exchanges of capabilities of the terminals, in particular through the usage of the SIP OPTIONS such as provided for by the RCS standard, while avoiding blocking a terminal of a user in a fallback mode of transmission, the RCS standard provides that the reception by the terminal of a user of a message of the terminal of the contact via the first network triggers the return of the terminal of the user into a mode of transmission using this first network for the terminal of the contact.

FIG. 1a shows a terminal of a user TU exchanging messages: mssg1, mssg2, mssg3, mssg4 with a terminal of a contact TC. The RCS standard provides that a first network is used as default network for message transmission: the IP network and that a second network as fallback network: SMS network. Thus, the RCS terminals are, by default, in a first mode of transmission MT=MT1 allowing message sending via the first network. Thus, in a first stage Ph I as shown by the example of FIG. 1a, the terminal of the user TU sends to the terminal of a contact TC a first message mssg1 on the default network: the first network, snd1 (mssg1).

The terminal of the contact TC not being connected to the first network: TC≠$cnx_1$, the messaging server of the terminal of the contact $SM_C$ receives the first message mssg1 and stores it in particular in a temporary memory or a message database BDD_MSSG with a view to transferring it to the terminal of the contact when it becomes connected again to the first network. The terminal of the user TU then triggers a countdown of a predetermined time span on the expiry of which, if the first message mssg1 has not been transmitted by the messaging server $SM_C$ to the terminal of the contact TC, the terminal of the user TU sends a revocation of the transfer of the first message to the messaging server $SM_C$: Revoke(mssg1). Thus, the first message mssg1 is deleted from the memory BDD_MSSG of the messaging server $SM_C$. Concomitantly, the terminal of the user TU toggles into a second mode of transmission for the terminal of the contact MT(tc)=MT2, and then retransmits the first message via the second network (this time): send2(mssg1), in this instance in SMS form. When the terminal of the user TU sends a second message mssg2 destined for the terminal of the contact TC, it still does so on the second network: send2(mssg2) since the terminal of the user is still in the second mode of transmission for the terminal of the contact MT(tc)=MT2.

In a second stage Ph IIa, the terminal of the contact has reconnected to the first network TC=$cnx_1$. If, as shown by FIG. 1a, the terminal of the contact TC sends on the default network, namely the first network, a third message to the terminal of the user TU: snd1(mssg3), then the RCS standard provides that the reception of this third message originating from the terminal of the contact TC on the first network triggers the return of the terminal of the user into the first mode of transmission for the terminal of the contact: MT(tc)=MT1. Thus, the sending by the terminal of the user TU of a fourth message to the terminal of the contact TC will be done using the first network: send1(mssg4).

FIG. 1b illustrates a message exchange chart implementing the RCS standard in the case where the terminal of the user is disconnected from the first network when the terminal of a contact reconnects to the first network, according to the prior art. The first phase Ph I, not illustrated, corresponds to that of FIG. 1a.

In a second stage Ph IIb, the terminal of the contact has reconnected to the first network TC=$cnx_1$. As shown by FIG. 1b, the terminal of the contact TC sends on the default network, namely the first network, a third message to the terminal of the user TU: snd1(mssg3). If at that moment, the terminal of the user TU is disconnected from the first network TU≠$cnx_1$, then the third message will not be remitted to the terminal of the user TU via the first network. The terminal of the user TU not being connected to the first network: TU≠$cnx_1$, the messaging server of the terminal of the user $SM_U$ receives the third message mssg3 and stores it in particular in a temporary memory or a message database BDD_MSSG with a view to transferring it to the terminal of the user TU when it becomes connected again to the first network. The terminal of the contact TC then triggers a countdown of a predetermined time span on the expiry of which, if the third message mssg3 has not been transmitted by the messaging server $SM_U$ to the terminal of the user TU, the terminal of the contact TC sends a revocation of the transfer of the third message to the messaging server $SM_U$: Revoke(mssg3). Thus, the third message mssg3 is deleted from the memory BDD_MSSG of the messaging server $SM_U$. Concomitantly, the terminal of the contact TC toggles into a second mode of transmission for the terminal of the user MT(tu)=MT2, and then retransmits the third message via the second network (this time): send2(mssg3), in this instance in SMS form.

If the terminal of the user TU then retrieves its coverage by the first network, that is to say if it is again connected to the first network, then, unless it has received information via the SIP OPTIONS messages provided for by the RCS standard, the terminal of the user is blocked in the second mode of transmission MT(tc)=MT2 and will transmit a fourth message using the second network:send2(mssg4) whilst both terminals: the terminal of the user TU and the terminal of the contact TC are connected to the first network. Thus, if, to reduce the use of the resources, the use of the SIP OPTIONS that is provided for by the RCS standard is deleted, the risk is that the terminals remain blocked in the fallback mode of transmission in certain situations.

Figure 2:
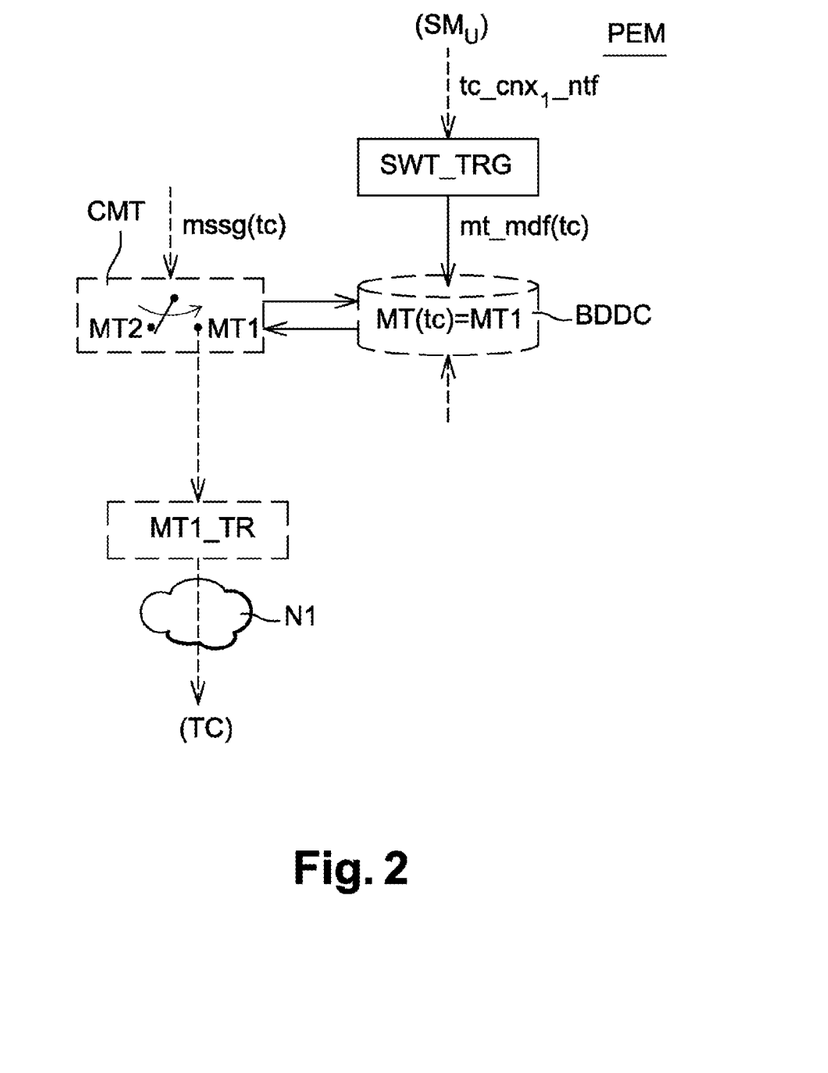

FIG. 2 illustrates a simplified diagram of a method for exchanging messages implemented by a terminal of a user according to the invention. The method for exchanging messages PEM comprises, when the terminal of the user is in a second mode of transmission for a terminal of a contact, a triggering of a toggling SWT_TRG of the terminal of the user into a first mode of transmission for the terminal of the contact MT(tc)=MT1 upon receipt of a notification to the terminal of the user of connection to the first network N1 of the terminal of the contact tc_cnx1_ntf originating from a messaging server on the first network $SM_U$.

In particular, the triggering of the toggling SWT_TRG is performed subsequent to a detection, by the messaging server $SM_U$, of connection of the terminal of the contact TC to the first network N1. In particular, the first network N1 is a data network, in particular an IP network and the second network N2 a circuit network, in particular a cellular network. In particular, the triggering of toggling SWT_TRG sends a command for modifying the mode of transmission for the terminal of the contact mt_mdf(tc), in particular to a contact database BDDC, in which the mode of transmission for each terminal of a contact is stored at least when the mode of transmission is the fallback mode of transmission, namely the second mode of transmission. If relevant, the method of exchange comprises, when sending a message to a terminal of a contact, a consultation of the contact database BDDC making it possible to determine the mode of transmission of the message to the terminal of the contact.

When transmitting a message to a terminal of a contact, the message is provided by default on sending according to a first mode of transmission, that is to say using the first network N1. The method for exchanging messages comprises in particular, this sending of the message according to the first mode of transmission. In particular, when the terminal of the contact TC is not connected to the first network N1, the message mssg is provided on sending according to a second mode of transmission MT2_TR, that is to say using the second network N2. The provision of the message on sending according to the second mode of transmission is performed by a switching CMT of the provision of the message from the sending according to the first mode of transmission MT1_TR to the sending according to the second mode of transmission MT2_TR as a function of a mode of transmission associated with the terminal of the recipient contact for the message MT(tc).

In particular, the method for exchanging messages comprises a detection DCNX1_DTCT by the terminal of the user TU that the terminal of the contact TC is not connected to the first network N1, in particular by:
   absence of receipt of a notification of acknowledgment of receipt ACK, also termed notification of delivery, of the message by the terminal of the contact TC which enables the terminal of the user TU to know that the terminal of the contact TC is not connected to the first network N1,
   receipt NACK of an item of information in respect of non-delivery to the terminal of the contact TC of a message sent by the terminal of the user TU via the first network N1.

In particular, the triggering of toggling SWT_TRG sends the transmission mode modification command mt_mdf(tc) to the message provision switching CMT which then toggles from message provision on sending according to the second mode of transmission MT2_TR to sending according to the first mode of transmission MT1_TR for the sending of a message destined for the terminal of the contact TC. A particular embodiment of the method for exchanging messages is a program comprising program code instructions for the execution of the steps of the method for exchanging messages according to any of the claims when said program is executed by a processor.

Figure 3:
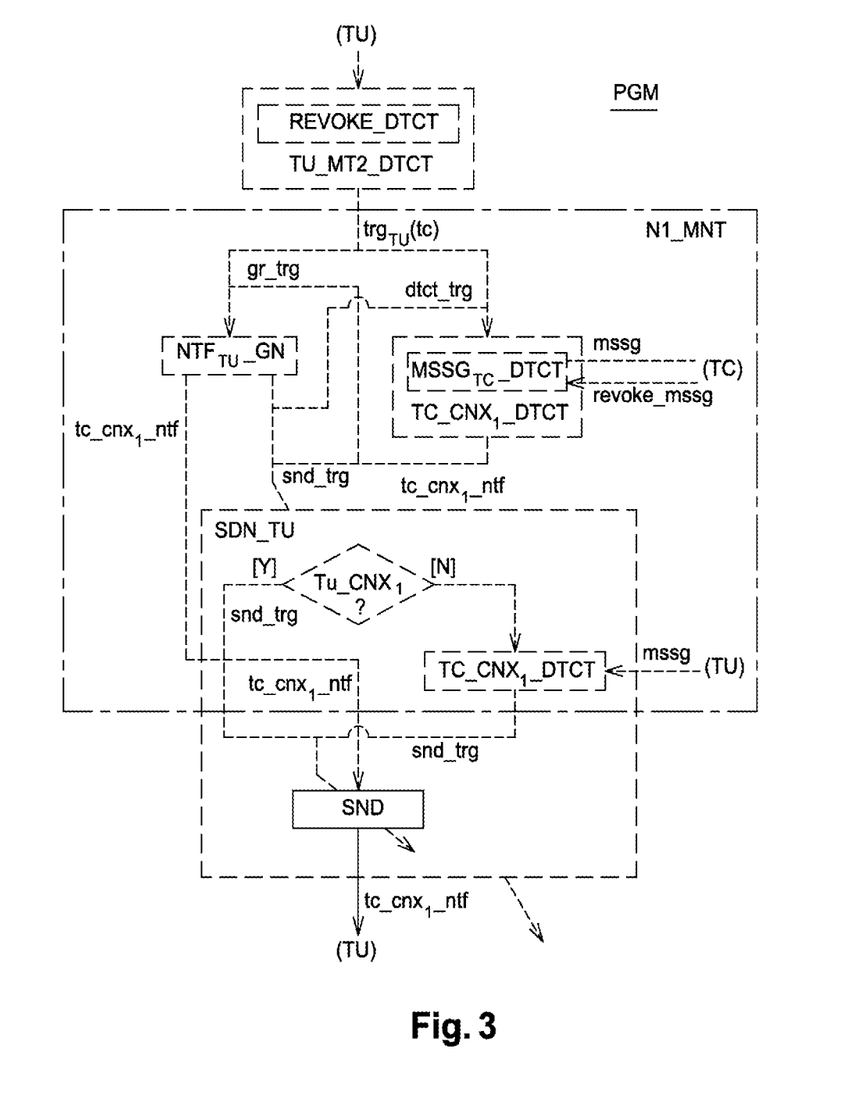

FIG. 3 illustrates a simplified diagram of a method for managing messages implemented by a messaging server according to the invention. The method for managing messages PGM comprises, when a terminal of a user TU is in a second mode of transmission MT2 for a terminal of a contact TC, a sending SND to the terminal of the user TU of a notification of connection to the first network of the terminal of the contact tc_cnx1_ntf, the notification of connection tc_cnx1_ntf triggering a toggling SWT_TRG of the terminal of the user TU into a first mode of transmission MT1 for the terminal of the contact TC. In particular, the method for managing messages PGM comprises, when a terminal of a user is in a second mode of transmission for a terminal of a contact, a detection of a connection to the first network of the terminal of the contact TC_CNX1_DTCT, subsequent to which the sending of the notification of connection SND is performed. In particular, the detection of connection to the first network of the terminal of the contact TC_CNX1_DTCT comprises a detection $MSSG_{TC}$_DTCT of a message mssg originating from the terminal of the contact TC via the first network N1. In particular, the detection of connection to the first network of the terminal of the contact TC_CNX1_DTCT comprises a detection $MSSG_{TC}$_DTCT of a reception by the messaging server SM of a control message for deleting a message stored on the messaging server revoke_mssg, the control message revoke_mssg originating from the terminal of the contact TC. In particular, the method for managing messages PGM comprises, when a terminal of a user is in a second mode of transmission for a terminal of a contact, a generation $NTF_{TU}$_GN of a notification of connection to the first network of a terminal of a contact tc_cnx1_ntf of a terminal of a user TU, the generation of the notification of connection $NTF_{TU}$_GN providing the notification of connection generated tc_cnx1_ntf on sending SND to the terminal of the user TU. In particular, the generation of notification of connection $NTF_{TU}$_GN is triggered by an event relating to a connection to the first network N1 of the terminal of the contact TC from among:
   The detection of connection to the first network of the terminal of the contact TC_CNX1_DTCT;
   A toggling CMT into a second mode of transmission MT2 of the terminal of the user TU for the terminal of the contact TC.

The detection of connection to the first network of the terminal of the contact TC_CNX1_DTCT makes it possible to detect an event relating to a first connection or a reconnection of the terminal of the contact TC to the first network such as:

A sending of a message on the first network by the terminal of the contact to a terminal of an interlocutor of the contact;

A sending of a message of connection to the first network N1 by the terminal of the contact, in particular a registration message such as SIP REGISTER or Third REGISTER received by the messaging servers SM of a control server S-CSCF (not illustrated), in particular when the terminal of the user TU and the terminal of the contact TC share the same messaging server SM;

A sending of a message of deletion revoke_mssg of a message sent by the terminal of the contact TC to the terminal of the user TU on the first network N1;

A sending of a notification of connection of the terminal of the contact to the first network by the messaging server of the contact destined for the messaging server of the terminal of a user, etc.

In particular, an implementation of the sending of the notification to the terminal of the user SND_TU is dependent on a state of connection to the first network of the terminal of the user $TU\_CNX_1?$.

The sending SND of the notification tc_cnx1_ntf is performed when the terminal of the user TU is in a second mode of transmission MT2 for the terminal of the contact TC. In particular, the method for managing messages PGM receives from the terminal of the user an item of information indicating the toggling of the terminal of the user TU into the second mode of transmission MT2 for the terminal of the contact TC. Alternatively, the method for managing messages PGM determines whether the terminal of the user TU is in a second mode of transmission MT2 for the terminal of the contact TC. In particular, the method for managing messages PGM comprises a detection of the toggling of the terminal of the user into the second mode of transmission TU_MT2_DTCT. For example, the detection of the toggling into the second mode of transmission TU_MT2_DTCT comprises a detection REVOKE_DTCT of the messages of revocation or of deletion of the stored messages originating from the terminal of the user TU. Thus, the determination of the toggling into the second mode of transmission MT2 of a terminal of a user TU for a terminal of a contact TC: receipt of a toggling information item, detection of the toggling TU_MT2_DTCT triggers trgTU(tc) a monitoring of the first network N1_MNT triggering the sending SND of a notification of connection to the first network of the terminal of the contact tc_cnx1_ntf. This monitoring of the first network N1_MNT comprises at least a detection $TC\_CNX_1\_DTCT$ of connection of the terminal of the contact to the first network.

In particular, the determination of the toggling into the second mode of transmission MT2 of a terminal of a user TU for a terminal of a contact TC: receipt of a toggling information item, detection of the toggling TU_MT2_DTCT triggers trgTU(tc) the generation of notification of connection $NTF_{TU}\_GN$, which itself triggers dtct_trg the detection $TC\_CNX_1\_DTCT$ of connection of the terminal of the contact to the first network. In this option, the lag between the connection to the first network of the terminal of the contact and the toggling of the terminal of the user into the first mode of connection for the terminal of the contact is optimized since reduced by the notification of connection $NTF_{TU}\_GN$ generation time. In this case, it is the detection $TC\_CNX_1\_DTCT$ of connection of the terminal of the contact to the first network which directly or indirectly triggers snd_trg the sending SND to the terminal of the user TU of the notification tc_cnx1_ntf provided by the generation of notification of connection $NTF_{TU}\_GN$.

Alternatively, the determination of the toggling into the second mode of transmission MT2 of a terminal of a user TU for a terminal of a contact TC: receipt of a toggling information item, detection of the toggling TU_MT2_DTCT triggers trgTU(tc) the detection $TC\_CNX_1\_DTCT$ of connection of the terminal of the contact to the first network, which itself triggers dtct_trg the generation of notification of connection $NTF_{TU}\_GN$. Thus, the storage resources of the messaging server SM are optimized since the notification of connection tc_cnx$_1$_ntf is stored only if the terminal of the user TU is not connected to the first network N1 during the generation of the notification of connection $NTF_{TU}\_GN$. In this case, it is the generation of notification of connection $NTF_{TU}\_GN$ which provides the notification of connection tc_cnx1_ntf and directly or indirectly triggers snd_trg its sending SND to the terminal of the user TU.

In the case of an indirect triggering snd_trg of the sending SND, it is a sending to a terminal of a user SND_TU which is triggered snd_trg directly either by the detection of connection TC_CNX1_DTCT, or by the generation of notification of connection NTFTU_GN, or by the monitoring of the first network N1_MNT. In particular, the sending to the terminal of the user SND_TU comprises the sending SND of the notification of connection tc_cnx1_ntf to the terminal of the user TU. Optionally, the sending to the terminal of the user SND_TU comprises, furthermore, a verification of the connection of the terminal of the user to the first network TU_CNX1?. If the connection of the terminal of the user to the first network TU_CNX1? is verified [Y], that is to say if the terminal of the user TU is connected to the first network N1, then the verification TU_CNX1? triggers snd_trg the sending SND to the terminal of the user TU of the notification of connection tc_cnx1_ntf provided by the generation of notification of connection $NTF_{TU}\_GN$. If the connection of the terminal of the user to the first network TU_CNX1? is not verified [N], that is to say if the terminal of the user TU is not connected to the first network N1, then the verification TU_CNX1? triggers a detection of connection of the terminal of the user to the first network TU_CNX1_DTCT. In particular, the reception by the messaging server of a message mssg originating from the terminal of the user TU via the first network N1 makes it possible to detect such a connection to the first network. The message is, for example, a message of registration on the first network N1, such as SIP REGISTER. The detection of connection of the terminal of the user to the first network TU_CNX1_DTCT triggers snd_trg the sending SND to the terminal of the user TU of the notification of connection tc_cnx1_ntf provided by the generation of notification of connection $NTF_{TU}\_GN$, and optionally stored in a memory of the messaging server. In particular, the monitoring of the first network N1_MNT also comprises the verification TU_CNX1? and, if the connection of the terminal of the user to the first network TU_CNX1? is not verified [N], the detection of connection of the terminal of the user to the first network TU_CNX1_DTCT.

An exemplary embodiment of the message management method could use, as sending of notification of connection, the provision, also termed "push" function in English, of a method of storage and transfer implemented by the messaging server, in particular the "store&forward" or "push enabler" function such as provided for in certain standard: e.g. the RCS, OMA standard, etc. Thus, the provision or "push" function could sent in addition to the messages stored by the messaging server, in particular pending a reconnection of the terminal of the recipient, a new type of content namely the notifications tc_cnx1_nft of connection of the contacts to the first network, such as are provided for by the invention. Furthermore, if necessary, the storage of the method of storage and transfer implemented by the messaging server, in particular the "store&forward" or "push enabler" function such as provided for in certain standard: e.g. the RCS, OMA standard, etc. will be able to be used to preserve the notification of connection generated by the message management method pending the triggering of the sending of the notification of connection.

In the case where the terminal of the user TU and the terminal of the contact TC do not share the same messaging server SM, the messaging server of the terminal of the contact $SM_C$ can implement a detection of connection of the contact to the first network $TC\_CNX_1\_DTCT$ triggering a sending SND of a notification of connection of the terminal of the contact TC to the first network N1. The sending by the messaging server of the contact $SM_C$ to the first network is performed destined for the messaging server of the terminal of a user $SM_U$ having toggled into a second mode of transmission MT2 for the terminal of the contact TC. A reception by the messaging server of the terminal of the user $SM_U$ of the notification of connection of the terminal of the contact to the first network tc_cnx1_ntf, tc_cnx1_ntf* constitutes, in particular, the detection of connection of the terminal of the contact to the first network $TC\_CNX_1\_DTCT$ by the messaging server of the terminal of the user $SM_U$ triggering the sending SND, by the messaging server of the terminal of the user $SM_U$, of a notification of connection of the terminal of the contact to the first network tc_cnx1_ntf. The notification of connection tc_cnx1_ntf is sent by the messaging server of the terminal of the user $SM_U$ destined for the terminal of the user TU triggering the toggling into the first mode of transmission SWT_TRG of the terminal of the user TU for the terminal of the contact TC. In particular, either the messaging server of the terminal of the user $SM_U$ relays the notification of connection received tc_cnx1_ntf from the messaging server of the terminal of the contact $SM_C$, or the messaging server of the terminal of the user $SM_U$ generates $NTF_{TU}\_GN$ a new notification of connection tc_cnx1_ntf subsequent to the receipt of the notification of connection received tc_cnx1_ntf* from the messaging server of the terminal of the contact $SM_C$, also called inter-operator notification tc_cnx1_ntf*.

Note: the method for managing messages PGM can also be implemented by the messaging server of the terminal of the contact $SM_C$ (cf. FIGS. 5, 6), and the method for exchanging messages PEM by the terminal of the contact TC which then becomes the terminal of the user claimed. Thus, the description and the claims will be read while replacing the terminal of the user by the terminal of the contact and, conversely, the terminal of the contact by the terminal of the user.

A particular embodiment of the method for managing messages is a program comprising program code instructions for the execution of the steps of the method for managing messages according to any of the claims when said program is executed by a processor.

Figure 4:
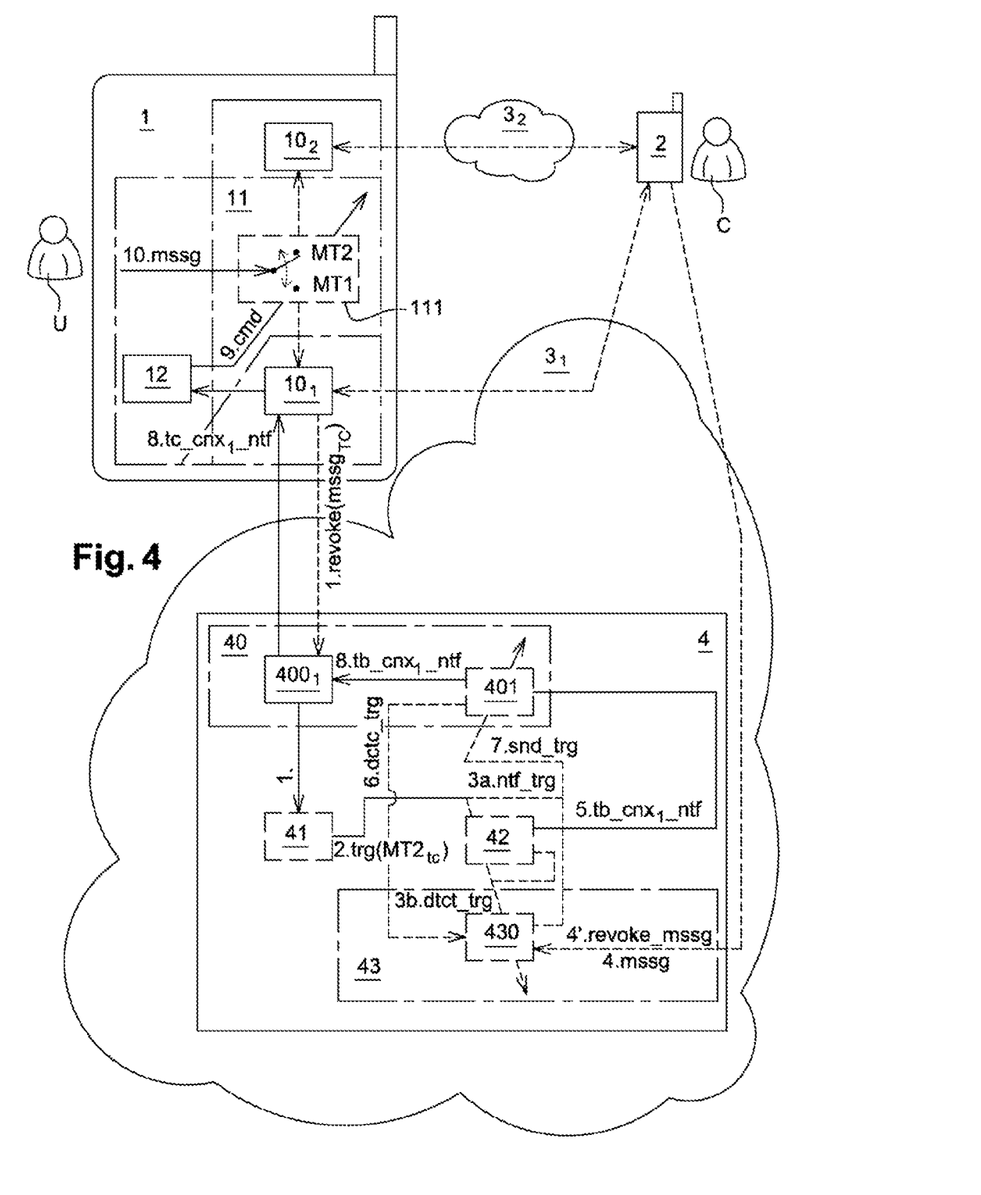

FIG. 4 illustrates a message communication architecture implementing a terminal of a user and a messaging server according to the invention. A subject of the invention is a device for communicating messages 11. The device for communicating messages 11 is implemented in a terminal 1 of a user U. The communication device 11 transmits a message mssg via a network $3_1$, $3_2$ from among: a first network $3_1$ and a second network $3_2$. The communication device 11 comprises a controller 12 triggering cmd, on receipt of a notification tc_cnx1_ntf to the terminal of the user 1 of connection to the first network of the terminal of the contact originating from a messaging server 4 on the first network $3_1$, a toggling of the terminal of the user 1 into a first mode of transmission MT1 for a terminal 2 of a contact C, when the terminal of the user 1 is in a second mode of transmission MT2 for the terminal of the contact 2. In particular, the device for communicating messages 11 comprises a switch 111 making it possible to provide a message to a first transmitter $10_1$, that is to say a transmitter on a first network, or a second transmitter $10_2$, that is to say a transmitter on a second network, as a function of the mode of transmission of the switch 111, respectively the first mode of transmission MT1 or the second mode of transmission MT2. The controller 12 then commands cmd, on receipt of a notification tc_cnx1_ntf of connection to the first network of the terminal of the contact, the toggling of the switch 111 into a first mode of transmission MT1 when sending a message destined for the terminal of the contact 2.

Optionally, the device for communicating messages 11 comprises a contact database 12 (not illustrated). Either, are recorded, in this contact database 12, at least the terminals of the contacts 2 when they are not connected to the first network $3_1$. In this case, the switch 111 is, by default, in the first mode of transmission, and consults, for the terminal of the contact 2 for which the message mssg is intended, the contact database 12. If the terminal of the contact 2 is recorded in the base 12, the switch 12 toggles into the second mode of transmission MT2. Then, on receipt of a notification tc_cnx1_ntf of connection to the first network of the terminal of the contact, the controller 12 commands cmd the deletion of the terminal of the contact 2 from the database 12, toggling the terminal of the user 1 into the first mode of transmission for the terminal of the contact 2. Thus, the switch 111 consulting, for the terminal of the contact 2 for which a message mssg is intended, the contact database 12 and not finding therein the terminal of the contact 2, remains, by default, in the first mode of transmission MT1 for the sending of the message destined for the terminal of the contact 2. Or, are recorded, in this contact database 12, the terminals 2 of all the contacts of the terminal of the user regardless of their connections, and for each terminal of a contact 2, a mode of transmission is associated therewith: default, the first mode of transmission MT1 and, when the terminal of the contact 2 is not connected to the first network $3_1$, the second mode of transmission MT2. In this case, when the terminal of the user 1 is in a second mode of transmission for a terminal of a contact 2, that is to say when the mode of transmission associated with the terminal of the contact 2 is the second mode of transmission MT2 in the contact database 12, on receipt of a notification tc_cnx1_ntf of connection to the first network of the terminal of the contact, the controller 12 commands cmd the modification of the mode of transmission associated with the terminal of the contact 2 in the database 12, toggling the terminal of the user 1 into the first mode of transmission for the terminal of the contact 2. Thus, the switch 111 consulting, for the terminal of the contact 2 for which a message mssg is intended, the contact database 12 and reads therein that the mode of transmission associated with the terminal of the contact 2 is the first mode of transmission, and remains in the default mode of transmission: the first mode of transmission MT1 for the sending of the message destined for the terminal of the contact 2.

In particular, the device for communicating messages 11 comprises a transmitter of messages on a first network $10_1$ and a transmitter of messages on a second network $10_2$.

Another subject of the invention is a terminal of a user 1 which comprises:
- a device for communicating messages 11 transmitting a message mssg via a network from among: a first network 3₁ and a second network 3₂; and
- a controller 12 triggering cmd, on receipt of a notification tc_cnx1_ntf to the terminal of the user 1 of connection to the first network of the terminal of the contact originating from a messaging server 4 on the first network 3₁, a toggling of the terminal of the user 1 into a first mode of transmission MT1 for a terminal of a contact 2, when the terminal of the user 1 is in a second mode of transmission MT2 for the terminal of the contact 2.

Thus, the controller 12 is either implemented directly in the terminal of the user 1 or in the device for communicating messages 11 as described hereinabove.

In particular, the device for communicating messages 11 comprises a switch 111 making it possible to provide a message to a first transmitter 10₁, that is to say a transmitter on a first network, or a second transmitter 10₂, that is to say a transmitter on a second network, as a function of the mode of transmission of the switch 111, respectively the first mode of transmission MT1 or the second mode of transmission MT2. The controller 12 then commands cmd, on receipt of a notification tc_cnx1_ntf of connection to the first network of the terminal of the contact, the toggling of the switch 111 into a first mode of transmission MT1 when sending a message destined for the terminal of the contact 2. Optionally, the terminal of the user 1 or the device for communicating messages 11 of the terminal of the user 1 comprises a contact database 12 (not illustrated) such as described previously. In particular, the terminal of the user 1 comprises a transmitter of messages on a first network 10₁ and a transmitter of messages on a second network 10₂ either implemented directly in the terminal of the user 1 or in the communication device 11 of the terminal of the user 1.

The communication architecture comprises in addition to:
- a terminal 1 of a user U,
- a terminal 2 of a contact C, and
- two communication networks 3₁ and 3₂, each making it possible to transmit messages between the terminal of the user 1 and the terminal of the contact 2 when they are connected to the network,
- at least one messaging server 4 on the first network 3₁.

The messaging server 4 of a first network 3₁ comprises a sender 400₁ making it possible to send, when a terminal of a user 1 is in a second mode of transmission MT2 for a terminal of a contact 2, to the terminal of the user 1 a notification of connection to the first network of the terminal of the contact 8.tc_cnx1_ntf, the notification of connection 8.tc_cnx1_ntf triggering 9.cmd a toggling of the terminal of the user 1 into a first mode of transmission MT1 for the terminal of the contact 2. In particular, the messaging server 4 comprises a detector 430 of connection to the first network of a terminal of a contact triggering a sending by the sender 400₁ of the notification of connection 8.tc_cnx1_ntf. In particular, the detector 430 of connection to the first network of the terminal of the contact TC_CNX1_DTCT comprises a detector 4301 (not illustrated) of a message 4.mssg originating from the terminal of the contact 2 via the first network 3₁. In particular, the detector 430 of connection to the first network of the terminal of the contact comprises a detector 4302 (not illustrated) of a reception by the messaging server 4 of a control message for deleting a message stored on the messaging server 4'. revoke_mssg, the control message 4'.revoke_mssg originating from the terminal of the contact TC.

In particular, the messaging server 4 comprises a generator 42 of a notification of connection to the first network of a terminal of a contact 5.tc_cnx1_ntf of a terminal of a user 1. The generator 42 is implemented when a terminal of a user 1 is in a second mode of transmission MT2 for a terminal of a contact 2. The generator 42 of the notification of connection provides the notification of connection generated 5.tc_cnx1_ntf to the sender 400₁ so as to be transmitted to the terminal of the user TU.

In particular, the generator 42 of notification of connection is triggered by a detector of an event relating to a connection to the first network N1 of the terminal of the contact TC from among:
- a detector 430 of connection to the first network of the terminal of the contact 2;
- a detector of disconnection from the first network of the terminal of the contact (not illustrated);
- a detector 41 of the toggling into a second mode of transmission MT2 of the terminal of the user 1 for the terminal of the contact 2, for example a detector of receipt of a message 1.revoke(mssg$_{TC}$) of revocation of a message of the terminal of the user destined for the terminal of the contact.

The detector 430 of connection to the first network of the terminal of the contact makes it possible to detect an event relating to a first connection or a reconnection of the terminal of the contact TC to the first network such as:
- A sending of a message 4.mssg on the first network by the terminal of the contact to a terminal of an interlocutor of the contact;
- A sending of a message of connection to the first network N1 by the terminal of the contact, in particular a registration message such as SIP REGISTER, when the terminal of the user 1 and the terminal of the contact 2 share the same messaging server 4;
- A sending of a message of deletion 4'.revoke_mssg of a message sent by the terminal of the contact 2 to the terminal of the user TU on the first network 3₁; etc.

In particular, the messaging server 4 comprises a provider 401 of the notification of connection to the sender on the first network 400₁ activated as a function of a state of connection to the first network of the terminal of the user 1.

In the example illustrated, the sender to the terminal of the user 40 comprises the sender on the first network 400₁ and a provider 401 of the notification of connection to the sender on the first network 400₁ activated as a function of a state of connection to the first network of the terminal of the user 1. Thus, the sender of the notification to the terminal of the user 40 (not illustrated) is activated as a function of a state of connection to the first network of the terminal of the user 1. The sender on the first network 400₁ transmits the notification tc_cnx1_ntf when the terminal of the user 1 is in a second mode of transmission MT2 for the terminal of the contact 2. In particular, the messaging server 4 receives from the terminal of the user 1 an item of information, such as a revocation message 1.revoke(mssg$_{TC}$), indicating the toggling of the terminal of the user TU into the second mode of transmission MT2 for the terminal of the contact TC.

Alternatively, the messaging server 4 determines whether the terminal of the user 1 is in a second mode of transmission MT2 for the terminal of the contact 2. In particular, the messaging server 4 comprises a detector 41 of the toggling of the terminal of the user into the second mode of transmission. For example, the detector 41 of the toggling into the second mode of transmission comprises a detector of the messages of revocation or of deletion of the stored messages originating from the terminal of the user 1. Thus, the detector 41 determining a toggling into the second mode of transmission MT2 of a terminal of a user 1 for a terminal of a contact 2: receipt of a toggling information item, detection of the toggling triggers 2.trg(MT2$_{TC}$) an monitor of the first network 43 (not illustrated) triggering a sending by the sender on the first network 400$_1$ of a notification of connection to the first network of the terminal of the contact 8.tc_cnx1_ntf. This monitor of the first network 43 comprises at least one detector 430 of connection of the terminal of the contact to the first network.

In particular, the detector 41 of the toggling into the second mode of transmission MT2 of a terminal of a user 1 for a terminal of a contact 2: receipt of a toggling information item, detection of the toggling triggers 2.trg(MT2$_{TC}$) the generator 42 of notification of connection, which itself triggers 3b.dtdt_trg the detector 430 of connection of the terminal of the contact to the first network. In this case, it is the detector 430 of connection of the terminal of the contact to the first network which directly or indirectly triggers 7.snd_trg the transmission by the sender on the first network 400$_1$ to the terminal of the user 1 of the notification 8.tc_cnx1_ntf provided by the generator 42 of notification of connection. Alternatively, the detector 41 determining a toggling into the second mode of transmission MT2 of a terminal of a user 1 for a terminal of a contact 2: receipt of a toggling information item, detection of the toggling triggers 2.trg(MT2$_{TC}$) the detector 430 of connection of the terminal of the contact to the first network, which itself triggers 3a.ntf_trg the generator 42 of notification of connection. In this case, it is the generator 42 of notification of connection which provides the notification of connection 5.tc_cnx1_ntf and directly or indirectly triggers 7.snd_trg the transmission by the sender on the first network 400$_1$ to the terminal of the user 1 of the notification 8.tc_cnx1_ntf.

In the case of an indirect triggering 7.snd_trg of the sender on the first network 400$_1$, it is the sender to a terminal of a user 401 which is triggered 7.snd_trg directly either by the detector 430 of connection, or by the generator 42 of notification of connection, or by the monitor of the first network 43. In particular, the sender to the terminal of the user 40 comprises the sender on the first network 400$_1$ of the notification of connection tc_cnx1_ntf to the terminal of the user 1. Optionally, the sender to the terminal of the user 40 comprises, furthermore, a connection analyzer 401 verifying the connection of the terminal of the user to the first network. If the connection of the terminal of the user to the first network is verified, that is to say if the terminal of the user 1 is connected to the first network 3$_1$, then the analyzer 401 triggers the transmission by the sender on the first network 400$_1$ to the terminal of the user 1 of the notification of connection tc_cnx1_ntf provided by the generator 42 of notification of connection, in particular by providing to the sender on the first network 400$_1$ the notification of connection 8.tc_cnx1_ntf. If the connection of the terminal of the user to the first network is not verified, that is to say if the terminal of the user 1 is not connected to the first network 3$_1$, then the analyzer 401 triggers a detector of connection of the terminal of the user to the first network. In particular, either the sender to the terminal of the user 40, or the monitor of the first network 43 (as illustrated by FIG. 4) comprises the detector 430 of connection of the terminal of the user to the first network. The detector 430 of connection of the terminal of the user to the first network triggers 7.snd_trg the provision by the analyzer 401 to the sender on the first network 400$_1$ of the notification of connection 8.tc_cnx1_ntf provided by the generator 42 of notification of connection, which then transmits it to the terminal of the user 1. In particular, the monitor 43 of the first network also comprises the analyzer 401 and the detector 430 of connection of the terminal of the user to the first network. In the example illustrated by FIG. 4, one and the same detector 430 is used by the messaging server to detect the connection to the first network 3$_1$ of the terminal of the user 1 and of the terminal of the contact 2. This is possible in particular when the terminal of the user 1 and the terminal of the contact 2 share the same messaging server 4. Optionally, the messaging server 4 can comprise distinct detectors of connection to the first network which differ for the terminal of the user and the terminal of the contact (not illustrated). In particular, when the messaging server 4 is the messaging server of the terminal of the user 1 and the terminal of the contact 2 has at its disposal another messaging server on the first network 3$_1$, the messaging server 4 can comprise two distinct detectors of connection to the first network. The advantage is that the detector of connection of the terminal of the user can comprise a simple monitor of the messages of registration of the terminal of the user received by the messaging server, whilst the detector of connection of the terminal of the contact will comprise a detector of all the messages originating from the terminal of the contact received by the messaging server 4 of the terminal of the user: message useful to a terminal of an interlocutor (not illustrated) sharing with the terminal of the user the messaging server 4, message of revocation of a message stored on the messaging server 4, etc.

Figure 5:
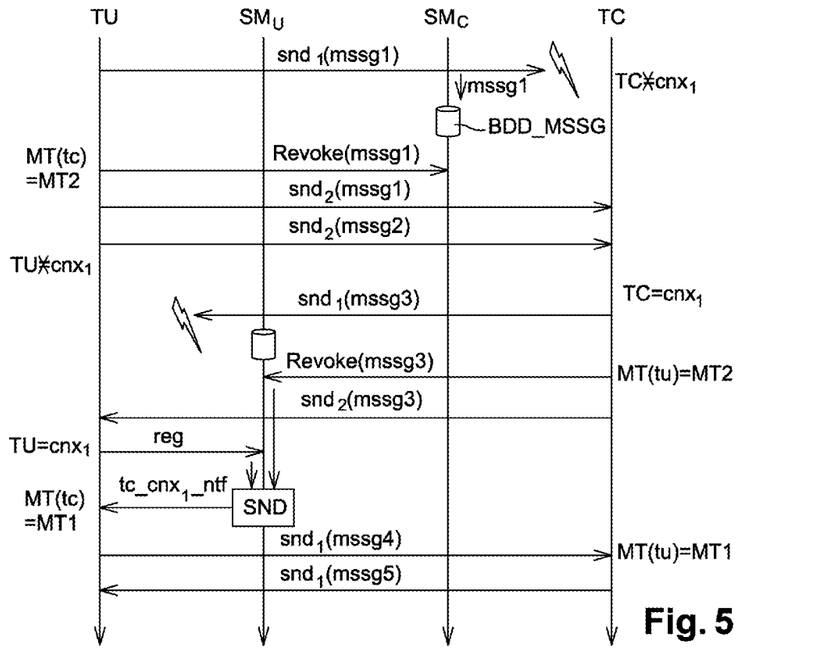

FIG. 5 illustrates a message exchange chart in the case where the terminal of the user is disconnected from the first network when the terminal of a contact reconnects to the first network, according to the invention. FIG. 5 deals again with the case of usage of FIG. 1b but with the implementation of the invention. Thus, the terminal of the user TU sends to the terminal of a contact TC a first message mssg1 on a default network: the first network, snd1_(mssg1).

The terminal of the contact TC not being connected to the first network: TC≠cnx$_1$, the messaging server of the terminal of the contact SM$_C$ receives the first message mssg1 and stores it in particular in a temporary memory or a message database BDD_MSSG with a view to transferring it to the terminal of the contact when it becomes connected again to the first network. The terminal of the user TU then triggers a countdown of a predetermined time span on the expiry of which, if the first message mssg1 has not been transmitted by the messaging server SM$_C$ to the terminal of the contact TC, the terminal of the user TU sends a revocation of the transfer of the first message to the messaging server SM$_C$: Revoke(mssg1). Thus, the first message mssg1 is deleted from the memory BDD_MSSG of the messaging server SM$_C$. Concomitantly, the terminal of the user TU toggles into a second mode of transmission for the terminal of the contact MT(tc)=MT2, and then retransmits the first message via the second network (this time): send2(mssg1), in this instance in SMS form. When the terminal of the user TU sends a second message mssg2 destined for the terminal of the contact TC, it still does so on the second network: send2(mssg2) since the terminal of the user is still in the second mode of transmission for the terminal of the contact MT(tc)=MT2.

After the terminal of the contact has reconnected to the first network TC=cnx$_1$, it sends on the default network, namely the first network, a third message to the terminal of the user TU: snd1(mssg3). If at that moment, the terminal of the user TU is disconnected from the first network TU≠cnx1, then the third message will not be remitted to the terminal of the user TU via the first network. The terminal of the user TU not being connected to the first network: TU≠$cnx_1$, the messaging server of the terminal of the user $SM_U$ receives the third message mssg3 and stores it in particular in a temporary memory or a message database BDD_MSSG with a view to transferring it to the terminal of the user TU when it becomes connected again to the first network. The terminal of the contact TC then triggers a countdown of a predetermined time span on the expiry of which, if the third message mssg3 has not been transmitted by the messaging server $SM_U$ to the terminal of the user TU, the terminal of the contact TC sends a revocation of the transfer of the third message to the messaging server $SM_U$: Revoke(mssg3). Thus, the third message mssg3 is deleted from the memory BDD_MSSG of the messaging server $SM_U$. Concomitantly, the terminal of the contact TC toggles into a second mode of transmission for the terminal of the user MT(tu)=MT2, and then retransmits the third message via the second network (this time): send2(mssg3), in this instance in SMS form.

If, the terminal of the user TU retrieves its coverage by the first network, that is to say if it is again connected to the first network, then the terminal TU sends, for example, a message of registration on the first network reg to the messaging server $SM_U$. Then, the method for managing messages according to the invention then transmits SND to the terminal of the user TU a notification tc_cnx1_nft indicating that the terminal of the contact to retrieve its connection. The method, illustrated by FIG. 5, for managing messages according to the invention comprises a detection of the connection of the terminal of the contact to the first network, in particular by detection either of a message mssg3 of the terminal of the contact TC to the terminal of the user TU via the first network N1, or of the revocation message revoke (mssg3) revoking this message mssg3, and, subsequent to this detection, a sending SND of a notification tc_cnx1_nft of connection to the first network of the terminal of the contact conditioned by a detection of connection to the first network of the terminal of the user, in this instance by reception of a registration message reg. The terminal of the user TU will then activate a return to the first mode of transmission, in the case of the RCS standard a return to "Chat", that is to say to instant messaging over IP, and will transmit a fourth message by using the first network: send1 (mssg4) since both terminals: the terminal of the user TU and the terminal of the contact TC are connected to the first network. Next, the terminal of the contact TC (which had itself toggled into a second mode of transmission MT2 for the terminal of the user TU) receiving this fourth message mssg 4 of the terminal of the user TU on the first network will toggle, as provided for by the RCS standard, into the first mode of transmission so as to continue the conversation on the first network by transmitting a fifth message snd1 (mssg5).

In this example, it is the knowledge by the messaging server $SM_U$ of the terminal of the user of the state of connectivity on the first network of the terminal of the contact TC and of the terminal of the user TU which brings about the remitting of the notification of connection tc_cnx1_ntf to the terminal of the user TU. In this instance, it is respectively the detection of a message from the terminal of the contact to the terminal of the user or the receipt of the revocation message, that is to say the receipt of the command for erasure of a message of the "Store&Forward" function of the RCS standard, originating from the terminal of the contact TC and the receipt of the message of registration of the terminal of the user to the first network, which triggers the sending by the messaging server $SM_U$ to the terminal of the user TU of a notification triggering the return of the terminal of the user TU to the default mode of transmission for its message exchanges with the terminal of the contact TC.

Figure 6:
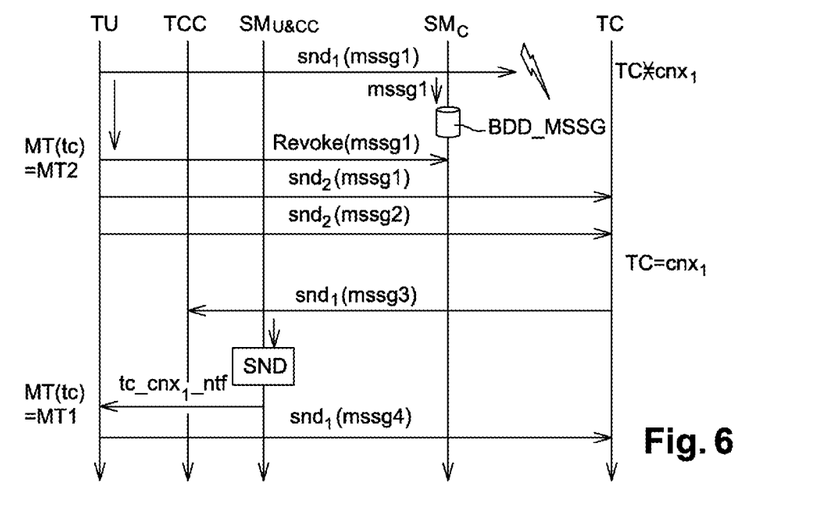

FIG. 6 illustrates a message exchange chart in the case where the messaging server of the terminal of the user detects a message on the first network of the terminal of a contact, according to the invention. The terminal of the user TU sends to the terminal of a contact TC a first message mssg1 on a default network: the first network, snd1(mssg1). The terminal of the contact TC not being connected to the first network: TC≠$cnx_1$, the messaging server of the terminal of the contact $SM_C$ receives the first message mssg1 and stores it in particular in a temporary memory or a message database BDD_MSSG with a view to transferring it to the terminal of the contact when it becomes connected again to the first network. The terminal of the user TU then triggers a countdown of a predetermined time span on the expiry of which, if the first message mssg1 has not been transmitted by the messaging server $SM_C$ to the terminal of the contact TC, the terminal of the user TU sends a revocation of the transfer of the first message to the messaging server $SM_C$: Revoke(mssg1). Thus, the first message mssg1 is deleted from the memory BDD_MSSG of the messaging server $SM_C$. Concomitantly, the terminal of the user TU toggles into a second mode of transmission for the terminal of the contact MT(tc)=MT2, and then retransmits the first message via the second network (this time): send2(mssg1), in this instance in SMS form. When the terminal of the user TU sends a second message mssg2 destined for the terminal of the contact TC, it still does so on the second network: send2(mssg2) since the terminal of the user is still in the second mode of transmission for the terminal of the contact MT(tc)=MT2.

If the terminal of the contact TC then retrieves the connection to the first network: TC≠$cnx_1$, it can send snd1 (mssg3) on the first network a third message destined for a terminal of an interlocutor TCC different from the terminal of the user TU. If the terminal of the interlocutor TCC and the terminal of the user TU shares the same messaging server $SM_U$, then the messaging server can detect the connection to the first network of the terminal of the contact TC upon this third message mssg3 and not wait for the reception by the terminal of the user TU of a message of the terminal of the contact TC via the first network as illustrated by the FIG. 1b. The messaging server $SM_U$ detecting the connection to the first network of the terminal of the contact TC, sends SND a notification tc_cnx1_ntf to the terminal of the user TU. The terminal of the user TU then toggles into the default mode of transmission, that is to say transmission on the first network, and can, henceforth, send snd1(mssg4) a fourth message to the terminal of the contact on the first network.

Consequently, FIG. 6 shows that the notification of connection makes it possible to revert as early as possible to the default network for the exchanges of messages.

The invention also envisages a medium. The information medium may be any entity or device capable of storing the program. For example, the medium can comprise a storage means, such as a ROM, for example a CD ROM or a microelectronic circuit ROM or else a magnetic recording means, for example a diskette or a hard disk. Moreover, the information medium can be a transmissible medium such as an electrical or optical signal which can be conveyed via an electrical or optical cable, by radio or by other means. The program according to the invention can be in particular downloaded over a network in particular of Internet type.

Alternatively, the information medium can be an integrated circuit into which the program is incorporated, the circuit being adapted to execute or to be used in the execution of the method in question.

In another implementation, the invention is implemented by means of software components and/or hardware components. In this regard the term module can correspond equally well to a software component or to a hardware component. A software component corresponds to one or more computer programs, one or more subprograms of a program, or more generally to any element of a program or of a piece of software able to implement a function or a function set according to the description hereinbelow. A hardware component corresponds to any element of a hardware assembly able to implement a function or a set of functions.

The invention claimed is:

1. A method of exchanging messages, the method implemented by a user terminal configured to transmit a message via one of a first network and a second network, the method implemented when the user terminal is in a fallback mode of transmission for a contact terminal, the fallback mode of transmission being a fallback mode of transmission from a first mode of transmission, the method comprising:
receiving a contact terminal network connection notification from a messaging server of the first network, the contact terminal network connection notification indicating that the contact terminal has connected to the first network, the messaging server of the first network configured to send the contact terminal network connection notification to the user terminal upon receipt of a message from the contact terminal via the first network; and
upon receipt of the contact terminal network connection notification originating from the messaging server, automatically triggering of a toggling of the user terminal into the first mode of transmission for the contact terminal, the toggling being performed while the user terminal is in the fallback mode of transmission for the contact terminal, before receipt by the user terminal of a message from the contact terminal in the first mode of transmission via the first network forwarded by the messaging server of the first network.

2. The method of claim 1, wherein automatically triggering the toggling is performed subsequent to a detection, by the messaging server, of connection of the contact terminal to the first network.

3. The method of claim 1, wherein the first network is a data network and the second network a circuit network.

4. A non-transitory, computer-readable medium having stored thereon instructions which when executed by a processor, cause the processor to perform the method of claim 1.

5. The method of claim 1, wherein the first network is a network of a first type and the second network is a network of a second type.

6. The method of claim 1, additionally comprising, prior to receiving the contact terminal network connection notification from a messaging server of the first network, toggling the user terminal from the first mode of transmission to the fallback mode of transmission due to a connectivity problem of the contact terminal in the first mode of transmission.

7. The method of claim 1, wherein the messaging server of the first network is configured to send the contact terminal network connection notification upon receipt of a message intended for the user terminal from the contact terminal via the first network.

8. A communication device for communicating messages of a user terminal, the communication device configured to transmit a message via one of a first network and a second network, the communication device comprising:
a controller configured to trigger, on receipt of a contact terminal network connection notification from a messaging server of the first network, the contact terminal network connection notification indicating that the contact terminal has connected to the first network, the messaging server of the first network configured to send the contact terminal network connection notification to the user terminal upon receipt of a message from the contact terminal via the first network, the contact terminal network connection notification configured to trigger a toggling of the user terminal of the user into a first mode of transmission for the contact terminal, when the user terminal is in a fallback mode of transmission for the contact terminal, the toggling being performed while the user terminal is in the fallback mode of transmission for the contact terminal, before receipt by the user terminal of a message from the contact terminal in the first mode of transmission via the first network forwarded by the messaging server of the first network.

9. A user terminal comprising a device for communicating messages configured to transmit a message via one of a first network and a second network, the user terminal comprising:
a controller configured to trigger, on receipt of a contact terminal network connection notification from a messaging server of the first network, the contact terminal network connection notification indicating that the contact terminal has connected to the first network, the messaging server of the first network configured to send the contact terminal network connection notification to the user terminal upon receipt of a message from the contact terminal via the first network, a toggling of the user terminal into a first mode of transmission for the contact terminal, when the user terminal is in a fallback mode of transmission for the contact terminal, the toggling being performed while the user terminal is in the fallback mode of transmission for the contact terminal, before receipt by the user terminal of a message from the contact terminal in the first mode of transmission via the first network forwarded by the messaging server of the first network.

10. A method of managing messages implemented by a messaging server on a first network, the method of managing messages implemented when a user terminal is in a fallback mode of transmission for a contact terminal, the fallback mode of transmission being a fallback mode of transmission from a first mode of transmission, the method comprising:
upon receipt of a message from the contact terminal via the first network, sending to the user terminal a contact terminal network connection notification, the contact terminal network connection notification indicating that the contact terminal has connected to the first network, the contact terminal network connection notification automatically triggering a toggling of the user terminal into the first mode of transmission for the contact terminal, before forwarding to the user terminal a message from the contact terminal in the first mode of transmission via the first network.

11. The method of claim 10, wherein the method for managing messages further comprises, when a user terminal is in a fallback mode of transmission for a contact terminal, detecting a connection to the first network of the contact terminal, subsequent to which the sending of the notification of connection is performed.

12. The method of claim 11, wherein detecting a connection to the first network of the contact terminal comprises detecting a message originating from the contact terminal via the first network.

13. The method of claim 11, wherein detecting a connection to the first network of the contact terminal comprises detecting a reception by the messaging server of a control message for deleting a message stored on the messaging server, the control message originating from the contact terminal.

14. The method of claim 10, wherein the method of managing messages comprises, when a terminal of a user is in a fallback mode of transmission for a terminal of a contact, a generation of a notification of connection to the first network of a terminal of a contact of a terminal of a user, the generation of the notification of connection providing the notification of connection generated on the sending to the terminal of the user.

15. The method of claim 14, wherein the generation of notification of connection is triggered by an event relating to a connection to the first network of the contact terminal from among:
   the detection of connection to the first network of the contact terminal; and
   a toggling into a fallback mode of transmission of the user terminal for the contact terminal.

16. The method of claim 14, wherein an implementation of the sending of the notification is dependent on a state of connection to the first network of the user terminal.

17. A messaging server of a first network comprising a sender configured to:
   upon receipt of a message from the contact terminal via the first network, send, when a user terminal is in a fallback mode of transmission for a contact terminal, to the user terminal a contact terminal network connection notification, the contact terminal network connection notification indicating that the contact terminal has connected to the first network, the contact terminal network connection notification automatically triggering a toggling of the user terminal into a first mode of transmission for the contact terminal, the toggling performed prior to receipt of a message by the user terminal from the contact terminal via the first network while the user terminal is in the fallback mode of transmission for the contact terminal, before forwarding to the user terminal a message from the contact terminal in the first mode of transmission via the first network.

18. The messaging server of claim 17, wherein the messaging server comprises a detector of connection to the first network of a contact terminal configured to trigger a sending by the sender of the notification of connection.

* * * * *